United States Patent
Rosenberger et al.

(10) Patent No.: US 7,410,685 B2
(45) Date of Patent: Aug. 12, 2008

(54) INFRARED-REFLECTIVE MATERIAL COMPRISING INTERFERENCE PIGMENTS HAVING HIGHER TRANSMISSION IN THE VISIBLE REGION THAN IN THE NIR REGION

(75) Inventors: Silvia Rosenberger, Darmstadt (DE); Guido Olbers, Darmstadt (DE); Dieter Heinz, Darmstadt (DE)

(73) Assignee: Merck Patent Gellschaft MIT Beschrankter Haftung, Darmstadt (DE)

( * ) Notice: Subject to any disclaimer, the term of this patent is extended or adjusted under 35 U.S.C. 154(b) by 0 days.

(21) Appl. No.: 10/437,198

(22) Filed: May 14, 2003

(65) Prior Publication Data

US 2003/0215627 A1 Nov. 20, 2003

(30) Foreign Application Priority Data

May 14, 2002 (DE) .................................. 102 21 518

(51) Int. Cl.
B32B 5/16 (2006.01)
(52) U.S. Cl. ...................... 428/206; 428/323; 428/207; 428/913; 428/918
(58) Field of Classification Search .............. 428/195.1, 428/206, 207, 323, 913, 918
See application file for complete search history.

(56) References Cited

U.S. PATENT DOCUMENTS

| 3,758,193 A * | 9/1973 | Tung ........................... 359/359 |
| 3,887,744 A | 6/1975 | Tomita et al. |
| 4,639,069 A * | 1/1987 | Yatabe et al. ................ 359/360 |
| 6,049,419 A * | 4/2000 | Wheatley et al. ............. 359/359 |
| 6,210,777 B1 * | 4/2001 | Vermeulen et al. ........ 428/195.1 |
| 6,376,075 B1 * | 4/2002 | Tacke-Willemsen et al. 428/402 |
| 6,689,205 B1 * | 2/2004 | Bruckner et al. ............ 106/415 |
| 6,692,824 B2 | 2/2004 | Benz et al. |
| 2003/0215627 A1 * | 11/2003 | Rosenberger et al. ........ 428/327 |

FOREIGN PATENT DOCUMENTS

| DE | 27 09 562 | 9/1977 |
| DE | 44 35 958 | 4/1996 |
| EP | 1 059 338 | 11/2000 |
| GB | 1 539 298 | 1/1979 |

OTHER PUBLICATIONS

European Abstract No. EP 1059338 dated Dec. 13, 2000.
Merck KGaa, "Glas im Bauwesen Bestimmung der lichttechnischen und strahlungsphysikalischen Kenngrössen von Verglasungen", DIN EN 410:1998-12.
Merck KGaA, Glass in building—Determination of light transmittance, solar direct transmittance, total solar energy transmittance and ultraviolet transmittance, and related glazing factors, ISO 1950, First Ed., (1990) pp. 1-8.

* cited by examiner

*Primary Examiner*—H. T Le
(74) *Attorney, Agent, or Firm*—Millen, White, Zelano, Branigan, P.C.

(57) ABSTRACT

The invention relates to an infrared-reflective material which comprises a transparent sheet material which comprises, on a part-area, an interference pigment which has higher transmission in the visible region of global radiation than in the NIR region, to a method for screening an enclosed area against infrared light, and to the use of the infrared-reflective material for buildings, vehicles and greenhouses while simultaneously maintaining the ability of the human eye to see through the material.

23 Claims, 2 Drawing Sheets

INFRARED-REFLECTIVE MATERIAL COMPRISING INTERFERENCE PIGMENTS HAVING HIGHER TRANSMISSION IN THE VISIBLE REGION THAN IN THE NIR REGION

The invention relates to a sheet material which has high transparency in the visible region of sunlight and high reflection in the near infra-red (NIR) region. These materials are employed for preventing excessively high temperatures in enclosed areas, for example buildings, vehicles or greenhouses, and at the same time producing high brightness.

BACKGROUND OF THE INVENTION

EP 0 548 822 describes a light-transparent, IR-reflective body which consists of a plastic base material and a coating layer adhering thereto. The coating layer comprises from 20 to 40% by weight of a single-layered interference pigment. This body has the disadvantage that, besides the NIR radiation, some of the visible light is also reflected, and that the light passing through is green and the reflected light is red. Furthermore, the translucent coating layer means that the transparency of the base material is lost (milk-glass effect).

DE 2 709 562 discloses a plastic film for shading plants against sunlight which is perforated and is provided with a white or metallic-lustre pigment or with a white or metallic-lustre coating, so that from 10 to 70% of the perpendicularly incident light is allowed to pass through. A plastic film of this type reduces the radiation uniformly over the entire wavelength range, i.e. both in the visible region and in the infrared region. Used on buildings, this would result in darkening of interior rooms, but this may be disadvantageous.

EP 1 059 338 describes a composition for coating transparent surfaces, as used for greenhouses, sheeting structures, domelights, roof windows or roof covers, which has high transparency in the visible region of sunlight and high reflection in the NIR region. The paint consists of a multilayered interference pigment consisting of a transparent support material which is coated with alternating layers of a material of low refractive index and a material of high refractive index, and a polymeric, organic binder. This translucent, NIR-reflective paint also causes the transparency of the base material to be lost.

U.S. Pat. No. 3,887,744 describes a transparent plate which is partly coated on its surface with aluminum, which regulates the percentage transmission of visible light and infrared rays. Either certain areas of the plate are coated with aluminum or the aluminium is applied as an ink by screen printing. Although details from the environment are evident from within the enclosed area in the case of this type of coating, aluminum does not, however, reflect wavelength-selectively with respect to the solar spectrum. This means that aluminium, in contrast to interference pigments, reflects both NIR radiation and visible light, which results in a reduction in brightness in the enclosed area.

SUMMARY OF THE INVENTION

An object of this invention is to provide an NIR-reflective material by means of which details from the environment are evident from within an enclosed area screened by the material without the reflection capacity for NIR radiation being significantly reduced compared with conventional coatings with interference pigments. Upon further study of the specification and appended claims, further objects and advantages of this invention will become apparent to those skilled in the art.

These and other objects are achieved in accordance with the invention by an infrared-reflective material comprising a transparent sheet material comprising at least one interference pigment which has higher transmission in the visible region of global radiation than in the NIR region, where the interference pigment is present in or on only part of the area bounded by the sheet material. For example, the transparent sheet can be continuous over the bounded area and the interference pigment provided on or in the sheet in less than the total area, e.g., only in selected printing areas or the transparent sheet can be discontinuous (e.g., contain perforations) with the interference pigment in all parts of the sheet but not in the areas of discontinuity, thus, not in all the area bounded by the sheet. Despite not covering the entire area, the interference pigment provides an NIR-reflective material having a high reflection capacity for NIR radiation.

The invention furthermore relates to a method for screening an enclosed area against infrared light, where surfaces of the area which are transparent to incident light are provided with an infrared-reflective material by applying a coating which comprises at least one interference pigment which has higher transmission in the visible region of global radiation than in the NIR region to part of the surface of the area which is transparent to incident light.

The invention furthermore relates to the use of the infrared-reflective material on buildings, vehicles and greenhouses.

The term transparent sheet material is taken to mean glass and transparent moldings, plastic materials, such as, plates, windows, doors, profiles and sheeting. Suitable transparent plastics are low- or high-density polyethylene, ethylene-vinyl acetate copolymer, polyvinylidene chloride, polyvinyl chloride, polycarbonate, polymethacrylate or mixtures thereof.

Interference pigments which can be employed in the infrared-reflective material in accordance with the invention are single- or multilayered. They have higher transmission in the visible region of global radiation than in the near infrared region (NIR), i.e. their transmission or reflection behavior is wavelength-selective. The term NIR region is taken to mean a wavelength range of from 780 to 2500 nm.

The interference pigments generally consist of a transparent support material and a coating of metal oxides. This support material can be, for example, natural or synthetic mica, another phyllosilicate, glass platelets, platelet-shaped silicon dioxide or aluminum oxide.

In the case of the multilayered pigments, 3, 5, 7 or more layers of metal oxides, but preferably 3 layers, are applied to the support material. The first layer preferably is of a material of high refractive index, which can be, for example, $TiO_2$, $ZrO_2$, $ZnO$ or a mixture of these oxides. Preference is given to colorless high-refractive-index metal oxides. The second layer preferably is of a material of low refractive index, for example $SiO_2$ or $Al_2O_3$. The third layer again preferably is of a material of high refractive index, which can be selected to be identical to or different from the material of the first layer. Colorless high-refractive-index metal oxides are preferred. If desired, one or more layer sequences of high- and low-refractive-index materials or alternatively a protective layer can be applied to this layer pack. The preparation of the pigments and their properties are described in greater detail in DE 196 18 569, for example.

Only multilayered interference pigments which have higher transmission in the visible region of global radiation than in the NIR region are employed. These can be selected with reference to their reflection spectra. Thus, pigments having a transmission minimum occurring in the wavelength range from 780 to 2500 nm are chosen.

Multilayered interference pigments which have the above-mentioned properties include, for example, Iriodin® SHR 870 and Iriodin® SHR 9870, which have a $TiO_2$—$SiO_2$—$TiO_2$ layer sequence on a mica support.

In the case of the single-layered interference pigments, the coating preferably is of a transparent, high-refractive-index metal oxide, such as, for example, titanium dioxide or zirconium dioxide. Here too, colorless metal oxides are preferred.

Iriodin® SHR 875 and Iriodin® SHR 9875 are single-layered interference pigments based on mica with a coating of titanium dioxide whose spectral properties are characterised by good transmission in the visible region and which have, in particular, a transmission maximum at the maximum sensitivity of the human eye. Their transmission minimum is in the NIR region. Thus, they are examples of pigments useful for the invention.

The infrared-reflective material according to the invention can comprise the interference pigment in a coating on the transparent sheet material or incorporated into the transparent sheet material.

In accordance with the invention, only part of the total surface of the transparent sheet material is covered with the coating comprising the interference pigments, or the interference pigments are only present in parts of the transparent sheet material.

The degree of coverage of the total surface is preferably 30-80%, more preferably 60-70%, based on the total transparent surface area.

The coating can be applied to the transparent surface in the form of a coating solution which comprises the interference pigment and at least one organic or inorganic binder and optionally further additives, and subsequently solidified by drying. Suitable organic binders include, for example, alkyd resins, vinyl resins, epoxy resins, polyurethanes, acrylates, polycarbonates, polyesters, polyethylene glycol and copolymers thereof.

Suitable inorganic binders include, for example, those which are suitable for frit systems, for example natural or synthetic silicates and mixtures thereof with various metal oxides.

The further additives which can be contained in the coating, include those usually employed in coating technology, such as, for example, thickeners, dispersion aids, wetting agents and plasticizers as well as solvents, such as water, esters, ketones, alcohols, aromatic compounds or the like.

The coating solution preferably comprises from 10 to 40% by weight, more preferably from 15 to 30% by weight, of interference pigment, based on the total weight of the coating solution.

It is advantageous for the part of the transparent surface which is covered by the coating or contains the interference pigment to be distributed uniformly over the entire surface, for example, to consist of small individual areas with adjacent uncovered or unscreened areas. The covered or screened areas are preferably in the form of dots, lines, graphic patterns, alphanumeric symbols or in irregular shapes which are distributed uniformly over the total surface.

This is achieved, for example, by means of common application methods, such as, for example, printing, spraying, knife coating, rolling, brushing, in each case with or without masks or stencils, or the like.

In one embodiment, the coating is preferably applied to the transparent sheet material by a printing process. Besides the interference pigment, the coating solution used for this purpose can comprise the usual ingredients for printing inks, such as the binders and additives already mentioned above.

The binders selected are advantageously materials which are suitable for mica pigments and frit systems, with the term frit systems being taken to mean printing inks which can be fired into the transparent sheet material. In order to match the printing ink to the respective substrate, further known additives can also be added.

Thus, the addition of about 5% by weight of an acrylic polymer dispersion enables, for example, better adhesion to glass to be achieved.

The screen-printing process has proven particularly suitable for application of the coating.

In the production of the infrared-reflective material according to the invention, a negative having the desired degree of coverage, which is taken to mean the ratio of coated surface area to total surface area, is produced using this process by a photographic method, as is generally used for printing. Using this negative, the coating solution is printed onto the transparent sheet material. In the screen-printing process, a grid is produced by means of whose size and the diameter of the grid dots the degree of coverage of the transparent surface can be adjusted.

The screens used for screen printing must be matched to the size of the pigment particles, which is generally in the range 5-100 µm. Owing to better selectivity of the NIR reflection, it is advantageous to employ pigments whose particle sizes are in the region of the fine fractions. For example, particle sizes of 5-25 µm may be mentioned here for single-layered pigments and of 10-60 µm for multilayered pigments.

A further embodiment of the invention consists in that the coating in the form of a coating solution which likewise comprises the above-mentioned constituents is applied to a further transparent sheet material, preferably a transparent plastic, and subsequently solidified by drying. Particularly suitable for this purpose are plates and films made from polyethylene, ethylene-vinyl acetate copolymer, polyvinylidene chloride, polyvinyl chloride, polycarbonate, polymethacrylate or mixtures thereof.

The coating solution here may be applied over the entire surface of the transparent sheet material and subsequently solidified by drying.

After the coating solution has been dried, the coated transparent sheet material is perforated so that only part of the total surface is covered by the coating comprising the interference pigment. Flat recesses are therefore located in the sheet material.

The proportion of the total surface area which is covered by the coating is generally 30-80%, preferably 60-70%, of the total transparent surface area.

This means that the transparent sheet material has a degree of perforation of 20-70%, in particular 30-40%.

The perforation can be carried out using generally known perforation techniques, such as stamping processes, flame perforation, laser-beam techniques, ultrasound or high-frequency processes and the like.

The perforation here is advantageously distributed uniformly over the entire surface and can be in the form of patterns or alphanumeric symbols.

In a further embodiment of the invention, an interference pigment is incorporated into the transparent sheet material, which preferably consists of plates or films made from a plastic, such as, polyethylene, ethylene-vinyl acetate copolymer, polyvinylidene chloride, polyvinyl chloride, polycarbonate, polymethacrylate or mixtures thereof.

In this process, the starting materials required for the production of the transparent sheet materials are mixed with the interference pigments. The transparent sheet materials are subsequently produced in a known manner, for example by extrusion or casting.

The interference pigment is present in the transparent sheet material in a concentration of 5-30% by weight, preferably 8-15% by weight, based on the total weight.

As already described, the transparent sheet material is subsequently perforated in such a way that 30-80% of the total surface area, preferably 60-70% of the total surface area, comprises the interference pigment.

The perforation is advantageously distributed uniformly over the entire surface and can be in the form of patterns or alphanumeric symbols.

In each of the above-mentioned embodiments of the invention, it is preferred that the constant change of covered and uncovered areas can be perceived by the human eye as a uniform area in which the covered areas are excluded by the brain and the missing image points are replaced by the transparent areas when looked through. In this way, the observer located in an area enclosed by the materials has the impression of an unhindered view to the outside.

Glazing provided with an infrared-reflective material in accordance with the present invention has a ratio of degree of light transmission to degree of solar transmission of greater than 1. Whereas the relative spectral distribution of solar radiation is included in the calculation of the degree of solar transmission, the determination of the degree of light transmission also takes into account the average brightness sensitivity of the human eye. Further details on the determination of these values are given in DIN EN 410.

The interference pigment is present in the coating, i.e., the dried coating, preferably in a concentration of from 15 to 50% by weight, more preferably from 20 to 35% by weight, based on the total weight of the coating.

This high pigment concentration results in very high reflection in the NIR region at the coated part-surfaces. Since the reflection behavior of an area is determined as the integral of the reflection over the entire surface, an equally high reflection of the NIR radiation can be achieved for the entire surface as in the case of a full-surface coating in accordance with the prior art, but without having to accept a restricted view.

In this way, the heat content of solar radiation is selectively reflected and the internal temperature in enclosed areas is kept comparatively low, even in the case of a high incidence of solar radiation, without considerable darkening or restriction of view occurring in the area.

In the method according to the invention, an enclosed area which has surfaces which are transparent to incident light is screened from infrared light through an infrared-reflective material being applied to part of the surface of the area which is transparent to incident light, where the material comprises a coating which comprises at least one interference pigment which has higher transmission in the visible region of global radiation than in the NIR region. The material does not cover the entire surface in question, but the reflection capacity for NIR radiation is not significantly reduced compared with conventional coatings with interference pigments which do cover the entire surface. By covering only part of the surface, particularly with small covered and uncovered areas uniformly distributed close together, the human eye perceives an essentially unobstructed view therethrough.

The term surfaces which are transparent to incident light is taken to mean surfaces or mouldings made from glass, transparent plastics or other solid, transparent materials which are generally employed for enabling the entry of natural light into enclosed areas, i.e. windows, doors, domelights, roof windows, roof covers and the like.

The infrared-reflective material according to the invention is either applied to existing surfaces which are transparent to instant light or forms the surface itself.

Thus, for example, it is possible for a material according to the invention which consists of a glass plate provided on part-areas with a coating which comprises an interference pigment which has higher transmission in the visible region of global radiation than in the NIR region to be employed in an enclosed area as a surface which is transparent to incident light.

Likewise, an existing uncoated glass surface, for example in a building, can be provided with a plastic film or plate which comprises the above-mentioned interference pigment over part of the surface, either in a coating or incorporated.

In the case where the enclosed area does not have to be protected against rain and influences caused by weathering, the last-mentioned plates or films can likewise be applied alone as infrared-reflective material.

The infrared-reflective material according to the invention is preferably used for building walls and roof covers, for example for domelights, and for glazing doors and windows of buildings. However, it can also be employed for vehicles, for example for trams. The variety of transparent sheet materials that can be employed and the various technologies for application of the coating allow embodiments which can be matched in an ideal manner to the particular application.

In all cases, excessive warming of the enclosed area by strong solar radiation is avoided, enabling the infrared-reflective material according to the invention also to be employed for greenhouses. The only partial coating of the transparent, sheet material enables details from the environment to be clearly recognized from within the interior.

The entire disclosure of all applications, patents and publications, cited herein and of corresponding German application No. 102 25 518.9 filed May. 14, 2002 is incorporated by reference herein.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Example 1

A screen-printable coating is prepared from a mixture of 85% by weight of a solvent-containing binder which is suitable for screen printing (PLN/093 from Pröll, Weissenburg) and 15% by weight of Iriodin® SHR 870/9870 (commercial product from Merck KGaA, Darmstadt) and printed onto a PET film using an Atma flat-bed screen-printing machine via a 52T flat-bed screen. A degree of coverage of the surface of 50% is set via a dot grid.

Figure 1:
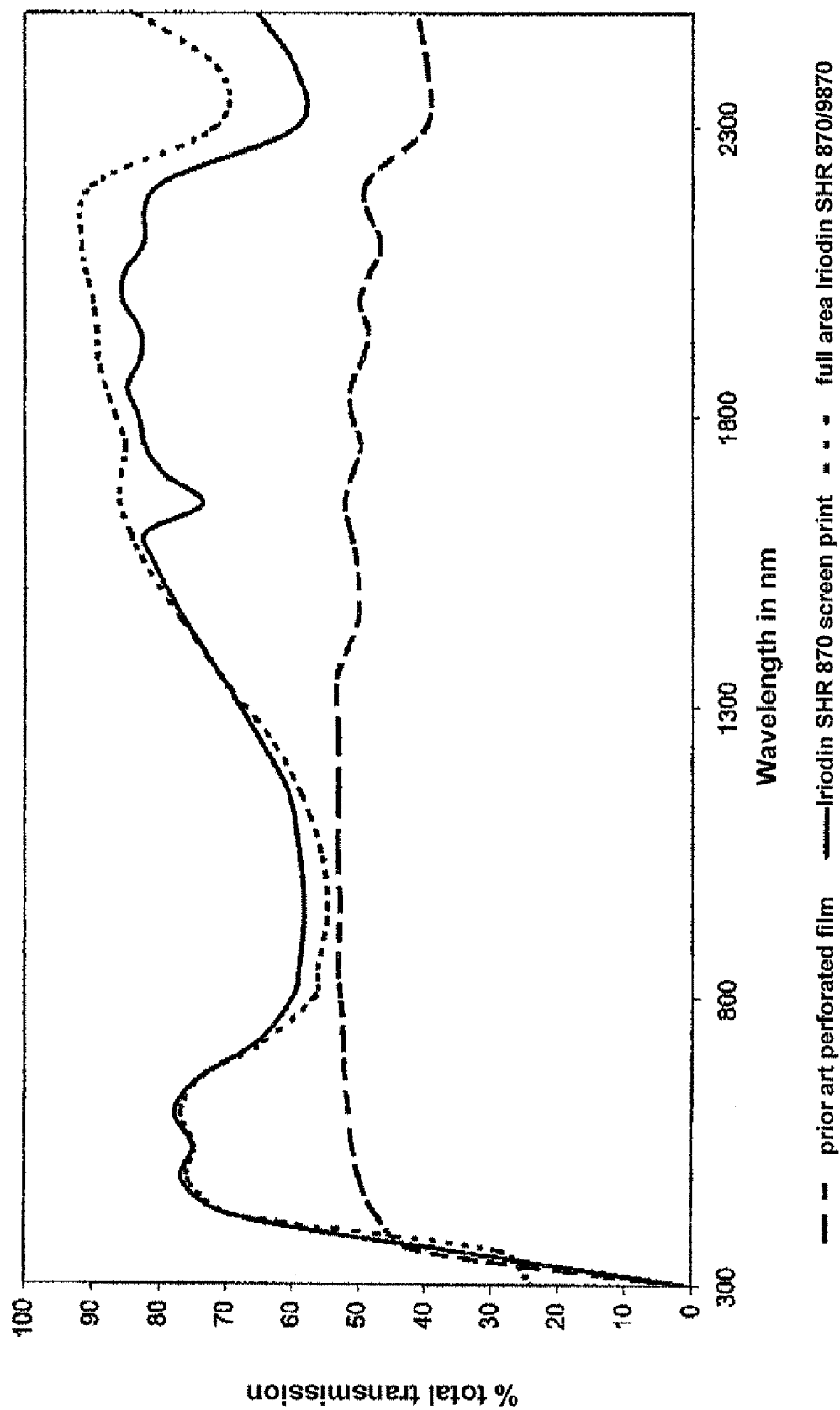
FIG. 1: Graph comparing the % transmission over of wavelength range for a prior art perforated film, a screen printed pigment film according to the invention and a full area pigment film from Example 1 and Comparative Examples 1 and 2.

A sample piece of the printed film having a size of 5×5 cm is subsequently measured spectrally using a Perkin-Elmer Lambda 900 spectrophotometer with integration sphere (150 mm) in the transmission position. The transmission is analyzed in the range from about 300 to about 2500 nm of the solar spectrum. The result is shown in FIG. 1.

Comparative Example 1

An extruded PE film having a thickness of 60 μm and a pigment content of 8% is produced using Iriodin® SHR 870/9870 as pigment. The degree of coverage of the surface here is 100%.

A sample piece having a size of 5×5 cm is subsequently measured spectrally using a Perkin-Elmer Lambda 900 spectrophotometer with integration sphere (150 mm) in the transmission position. The result is shown in FIG. 1.

Comparative Example 2

A sample piece having a size of 5×5 cm of a commercially available pigmented perforated film from 3M (Avery® perforated window film 6551, thickness about 200 μm, black back, printable front, hole size 1.5 mm, degree of coverage of the surface 50%) is measured spectrally using a Perkin-Elmer Lambda 900 spectrophotometer with integration sphere (150 mm) in the transmission position. The result is shown in FIG. 1.

A comparison of the transmission curves from Example 1 and Comparative Examples 1 and 2 in FIG. 1 shows that the commercially available perforated film from Comparative Example 2 has transmission values of about 50% over the entire solar spectrum. Selectivity thus cannot be achieved in screening against radiation in the NIR region. Since the film is perforated, it is transparent to a certain degree.

Due to the incorporation of a suitable pigment, the film from Comparative Example 1 exhibits selective screening of NIR radiation. High transmission can be obtained in the visible spectral region. The degree of solar transmission is 67%, the degree of light transmission is 76%. This gives a selectivity parameter of 1.13 with respect to solar radiation. Since the film is pigmented over the entire surface, however, a so-called milk-glass effect occurs, making it more difficult or impossible to see through the film.

In spite of the degree of coverage of only 50%, the infrared-reflective material according to the invention from Example 1 exhibits the same selectivity to incident solar radiation as the film from Comparative Example 1. Here too, a degree of solar transmission of 67% and a degree of light transmission of 76% are obtained, which gives a selectivity parameter of 1.13.

Since only 50% of the film surface is covered by the pigment-containing coating, however, the observer can see through the film without problems.

Example 2

A screen-printable coating is prepared from a mixture of 85% by weight of a solvent-containing binder which is suitable for screen printing (PLN/093 from Pröll, Weissenburg) and 15% by weight of Iriodin® SHR 875/9875 (commercial product from Merck KGaA, Darmstadt) and printed onto a PET film using an Atma flat-bed screen-printing machine via a 52T flat-bed screen. A degree of coverage of the surface of 50% is set via a dot grid.

Figure 2:
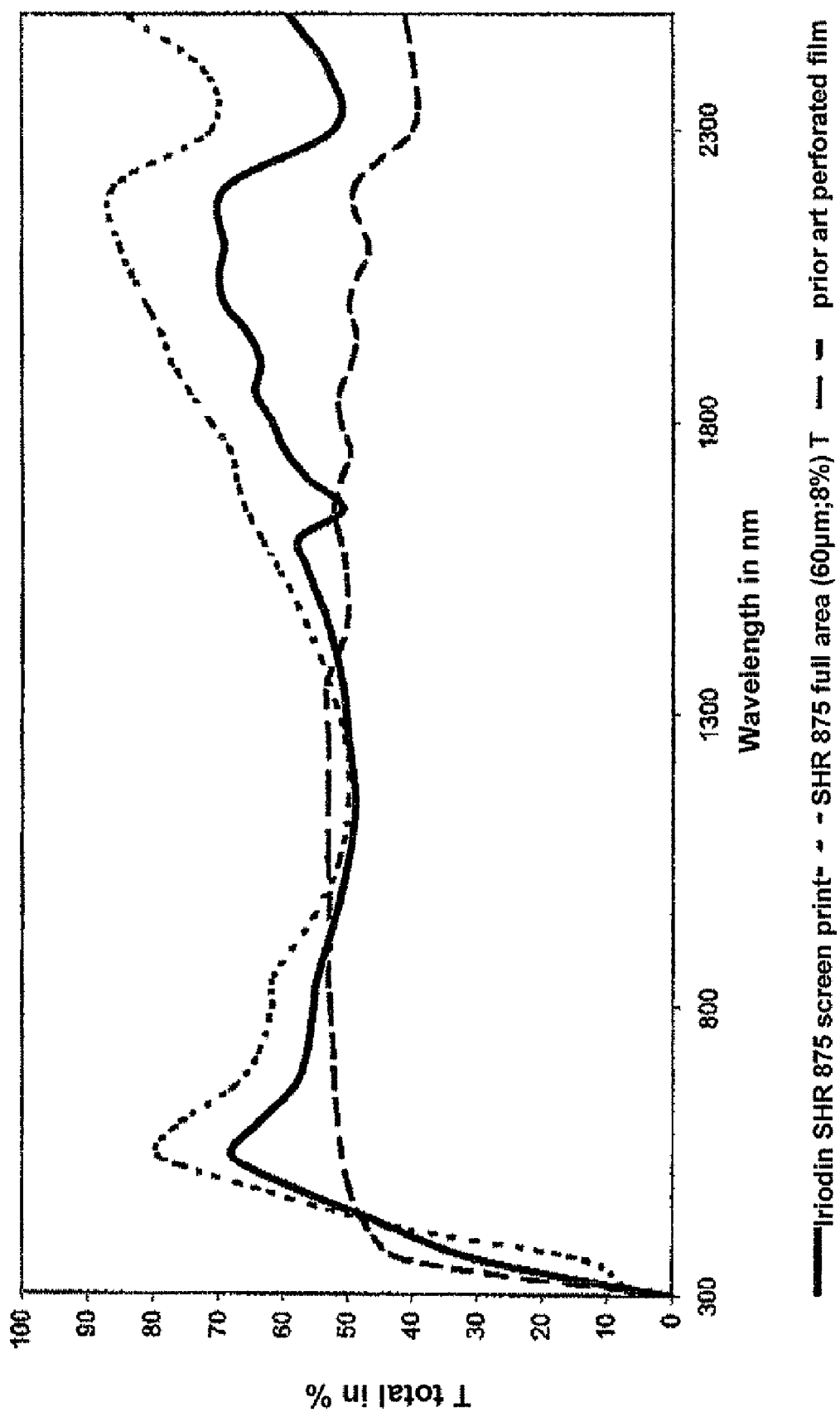
FIG. 2: Graph comparing the % transmission over of wavelength range for a prior art perforated film, a screen printed pigment film according to the invention and a full area pigment film from Example 2 and Comparative Examples 3 and 4.

A sample piece of the printed film having a size of 5×5 cm is subsequently measured spectrally using a Perkin-Elmer Lambda 900 spectrophotometer with integration sphere (150 mm) in the transmission position. The transmission here is analyzed in the range from about 300 to about 2500 nm of the solar spectrum. The result is shown in FIG. 2.

Comparative Example 3

An extruded PE film having a thickness of 60 μm and a pigment content of 8% is produced using Iriodin® SHR 875/9875 as pigment. The degree of coverage of the surface here is 100%.

A sample piece having a size of 5×5 cm is subsequently measured spectrally using a Perkin-Elmer Lambda 900 spectrophotometer with integration sphere (150 mm) in the transmission position. The result is shown in FIG. 2.

Comparative Example 4

A sample piece having a size of 5×5 cm of a commercially available pigmented perforated film from 3M (Avery® perforated window film 6551, thickness about 200 μm, black back, printable front, hole size 1.5 mm, degree of coverage of the surface 50%) is measured spectrally using a Perkin-Elmer Lambda 900 spectrophotometer with integration sphere (150 mm) in the transmission position. The result is shown in FIG. 2.

A comparison of the transmission curves from Example 2 and Comparative Examples 3 and 4 in FIG. 2 shows that the commercially available perforated film from Comparative Example 4 has transmission values of about 50% over the entire solar spectrum. Selectivity thus cannot be achieved in screening from radiation in the NIR region. Since the film is perforated, it is transparent to a certain degree.

Due to the incorporation of a suitable pigment, the film from Comparative Example 3 exhibits selective screening of NIR radiation. High transmission can be obtained in the visible spectral region. The degree of solar transmission is 60%, the degree of light transmission is 76%. This gives a selectivity parameter of 1.27 with respect to solar radiation. Only a moderate increase in temperature is thus expected in enclosed areas which are covered completely or partly by a film from Comparative Example 3 with entry of a large amount of light. Since the film is pigmented over the entire surface, however, a so-called milk-glass effect occurs, making it more difficult or impossible to see through the film.

In spite of the degree of coverage of only 50%, the infrared-reflective material according to the invention from Example 2 exhibits almost the same selectivity in screening of incident solar radiation as the film from Comparative Example 3. A degree of solar transmission of 57% and a degree of light transmission of 68% are obtained, which gives a selectivity parameter with respect to solar radiation of 1.19. Here too, a moderate increase in temperature occurs at the same time as entry of a large amount of light in enclosed areas which are completely or partly covered by the infrared-reflective material from Example 2. Since only 50% of the film surface is covered by the pigment-containing coating, however, the observer can see through the film without problems and in this way perceive movement and shapes outside the enclosed area.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An infrared-reflective material comprising a transparent sheet material and at least one interference pigment which has higher transmission in the visible region of global radiation than in the NIR region, wherein all or part of area bounded by the sheet material contains the interference pigment and those parts which contain the interference pigment consist of individual areas containing the interference pigment and adjacent areas not containing the interference pigment, such that the individual areas containing the interference pigment consist of dots, lines, graphic patterns, alphanumeric symbols or irregular shapes of pigment-containing areas uniformly distributed amongst the adjacent areas not containing the interference pigment, provided that either: the interference pigment is present in a coating on the transparent sheet material and the concentration of the interference pigment in the coating is 15-50% by weight, based on the total weight of the coating; or the interference pigment is incorporated into the transparent sheet material in the individual areas containing the interference pigment and the interference pigment is present in the transparent sheet material in a concentration of 5-30% by weight, based on the total weight of the material.

2. The material according to claim 1, wherein the transparent sheet material is of glass or plastic.

3. The material according to claim 1, wherein the interference pigment is present in a coating on the transparent sheet material, in a concentration of 15-50% by weight, based on the total weight of the coating.

4. The material according to claim 3, wherein the coating is printed onto the transparent sheet material in the individual areas containing the interference pigment.

5. The material according to claim 3, wherein the coating additionally comprises at least one binder.

6. The material according to claim 1, wherein the interference pigment is incorporated into the transparent sheet material in the individual areas containing the interference pigment and is present in the transparent sheet material in a concentration of 5-30% by weight, based on the total weight of the material.

7. The material according to claim 6, wherein the transparent sheet material is a plastic film.

8. The material according to claim 1, wherein the surface area of the parts of the transparent sheet material which contain the interference pigment has 30-80% of surface area of the individual areas containing the interference pigment and 20-70% of surface area of the adjacent areas not containing the interference pigment.

9. The material according to claim 1, wherein the interference pigment is single-or multilayered.

10. The material according to claim 9, wherein the pigment is a single-layered interference pigment with a mica substrate and titanium dioxide layer.

11. The material according to claim 9, wherein the multilayered interference pigment has a layer structure with the layer sequence mica titanium dioxide silicon dioxide titanium dioxide.

12. The material according to claim 1, wherein all of area bounded by the sheet material contains the interference pigment in the individual areas with the adjacent areas not containing the interference pigment.

13. The material according to claim 1, wherein only part of the area bounded by the sheet material contains the interference pigment in the individual areas with the adjacent areas not containing the interference pigment.

14. The material according to claim 1, wherein the pigment-containing areas are uniformly distributed amongst the adjacent areas not containing the interference pigment, such that, when viewed by the unaided human eye at a certain distance, at least partly, the pigment-containing areas are not perceived and an unhindered view through the material is provided.

15. The material according to claim 1, wherein the pigment-containing areas are uniformly distributed amongst the adjacent areas not containing the interference pigment, such that the constant change of pigment-containing covered and non-pigment-containing uncovered areas can be perceived by the unaided human eye as a uniform area in which the pigment-containing areas which are excluded are replaced by the brain and an unhindered view through the material is provided.

16. A method for screening an enclosed area against infrared light, where at least one surface of the area which is transparent to incident light is provided with an infrared-reflective material, by applying a coating which comprises at least one interference pigment which has higher transmission in the visible region of global radiation than in the NIR region to a surface of the area which is transparent to incident light wherein all or part of the surface area of the coating contains the interference pigment and those parts which contain the interference pigment consist of individual areas containing the interference pigment and adjacent areas not containing the interference pigment, such that the individual areas containing the interference pigment consist of dots, lines, graphic patterns, alphanumeric symbols or irregular shapes of pigment-containing areas uniformly distributed amongst the adjacent areas not containing the interference pigment, provided that either: the coating consists of a transparent sheet plastic which comprises the interference pigment in a layer thereon and the concentration of the interference pigment in the layer thereon is 15-50% by weight, based on the total weight of the layer;

or the coating consists of a transparent sheet plastic into which the said interference pigment has been incorporated in the individual areas containing the interference pigment and the interference pigment is present in the coating in a concentration of 5-30% by weight, based on the total weight of the coating.

17. A method according to claim 16, wherein the coating consists of said interference pigment and at least one binder.

18. The method according to claim 16, wherein the coating consists of a transparent sheet plastic which comprises the interference pigment in a layer.

19. The method according to claim 16, wherein the coating consists of a transparent sheet plastic into which the said interference pigment has been incorporated in the individual areas containing the interference pigment.

20. The method according to claim 16, wherein the coating is applied by a printing process.

21. The method according to claim 20, wherein the printing process is a screen printing process using a grid to exclude printing on the adjacent areas not containing the interference pigment.

22. The method according to claim 16, wherein the enclosed area is a room in a building, the inside of a vehicle or the inside of a greenhouse.

23. The method of claim 16, wherein the surface area of the parts of the transparent sheet material which contain the interference pigment has 30-80% of surface area of the individual areas containing the interference pigment and 20-70% of surface area of the adjacent areas not containing the interference pigment.

* * * * *

UNITED STATES PATENT AND TRADEMARK OFFICE
CERTIFICATE OF CORRECTION

| | |
|---|---|
| PATENT NO. | : 7,410,685 B2 |
| APPLICATION NO. | : 10/437198 |
| DATED | : August 12, 2008 |
| INVENTOR(S) | : Dieter Heinz |

Page 1 of 1

It is certified that error appears in the above-identified patent and that said Letters Patent is hereby corrected as shown below:

Column 9, line 46 reads "mica titanium dioxide silicon dioxide titanium", should read --mica-titanium dioxide-silicon dioxide-titanium--

Signed and Sealed this

Twenty-eighth Day of October, 2008

JON W. DUDAS
*Director of the United States Patent and Trademark Office*